United States Patent
Ponnuswamy

(10) Patent No.: US 10,009,951 B2
(45) Date of Patent: Jun. 26, 2018

(54) EXECUTING A CORRECTIVE ACTION BASED ON BEHAVIOR DETECTED DURING A CONNECTION STAGE

(71) Applicant: KodaCloud Inc., Campbell, CA (US)

(72) Inventor: Subbu Ponnuswamy, Saratoga, CA (US)

(73) Assignee: KodaCloud Inc., Campbell, CA (US)

( * ) Notice: Subject to any disclaimer, the term of this patent is extended or adjusted under 35 U.S.C. 154(b) by 84 days.

(21) Appl. No.: 15/150,694

(22) Filed: May 10, 2016

(65) Prior Publication Data
US 2017/0332430 A1 Nov. 16, 2017

(51) Int. Cl.
| | |
|---|---|
| H04W 24/02 | (2009.01) |
| H04W 76/18 | (2018.01) |
| H04W 76/02 | (2009.01) |
| H04L 12/26 | (2006.01) |
| H04W 4/00 | (2018.01) |
| H04W 76/19 | (2018.01) |
| H04W 4/80 | (2018.01) |

(52) U.S. Cl.
CPC .......... *H04W 76/18* (2018.02); *H04L 43/16* (2013.01); *H04W 4/008* (2013.01); *H04W 4/80* (2018.02); *H04W 76/027* (2013.01); *H04W 76/028* (2013.01); *H04W 76/19* (2018.02)

(58) Field of Classification Search
CPC ... H04W 36/08; H04W 36/22; H04W 36/245; H04W 4/008; H04W 84/12; H04W 88/08
See application file for complete search history.

(56) References Cited

U.S. PATENT DOCUMENTS

| | | | | |
|---|---|---|---|---|
| 7,814,542 B1* | 10/2010 | Day | ................ | G06F 21/552 713/188 |
| 2012/0185582 A1* | 7/2012 | Graessley | ................ | H04L 45/70 709/224 |
| 2013/0019020 A1* | 1/2013 | Kang | ................ | H04M 1/72561 709/227 |
| 2013/0208891 A1* | 8/2013 | Kholaif | ................ | H04W 12/04 380/270 |
| 2014/0038608 A1* | 2/2014 | Won | ................ | H04W 36/0011 455/436 |
| 2015/0058983 A1* | 2/2015 | Zeitlin | ................ | H04L 63/1408 726/23 |
| 2017/0013539 A1* | 1/2017 | Lepp | ................ | H04W 52/0229 |

\* cited by examiner

*Primary Examiner* — Mohamed Kamara
(74) *Attorney, Agent, or Firm* — Invoke

(57) ABSTRACT

Techniques are disclosed for executing a corrective action based on an unsuccessful completion of a connection stage in a process for establishing a wireless connection between a client device and an access point (AP). An event in a process for establishing a wireless connection between a client device and an AP is detected. A particular stage in the process for establishing the wireless connection is determined to be unsuccessfully completed. The unsuccessful completion may be determined based on (a) a timeout and/or (b) detection of an event indicating the particular stage has not been successfully completed. A cause associated with the particular stage not being completed is identified. Based on the cause, a corrective action is selected and executed.

20 Claims, 8 Drawing Sheets

EXECUTING A CORRECTIVE ACTION BASED ON BEHAVIOR DETECTED DURING A CONNECTION STAGE

TECHNICAL FIELD

The present disclosure relates to executing a corrective action in a wireless environment. In particular, the present disclosure relates to executing a corrective action based on behavior detected during a connection stage.

BACKGROUND

In recent years, Wireless Local Area Network (WLAN) technologies have emerged as a fast-growing market. Among the various WLAN technologies, the Institute of Electrical and Electronics Engineers (IEEE) 802.11 standard is the dominating technology and is frequently used for WLANs. The IEEE 802.11 standard includes operations in one or more bands (such as the 2.400-2.500 GHz band and/or the 4.915-5.825 GHz band), and multiple channels within each band.

Client devices within WLANs wirelessly communicate with network devices. A client device may communicate with a network device to obtain access to a network resource. Alternatively, a client device may receive broadcast data from a network device, even if the client device had not requested access to a network resource. The client device may connect to the network resource only in response to a request or trigger. Network devices, such as access points, are digital devices that may be communicatively coupled to one or more networks (e.g., Internet, an intranet, etc.). Network devices may be directly connected to the one or more networks or connected via a controller. A network device, as referred to herein, may include a wireless Access Point (AP) that communicates wirelessly with devices using Wi-Fi, WiGig, Zigbee, Bluetooth or related standards and that communicates with another wired or wireless network. A network device may provide a wireless coverage area, within which devices may wirelessly connect to a network through the network device.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
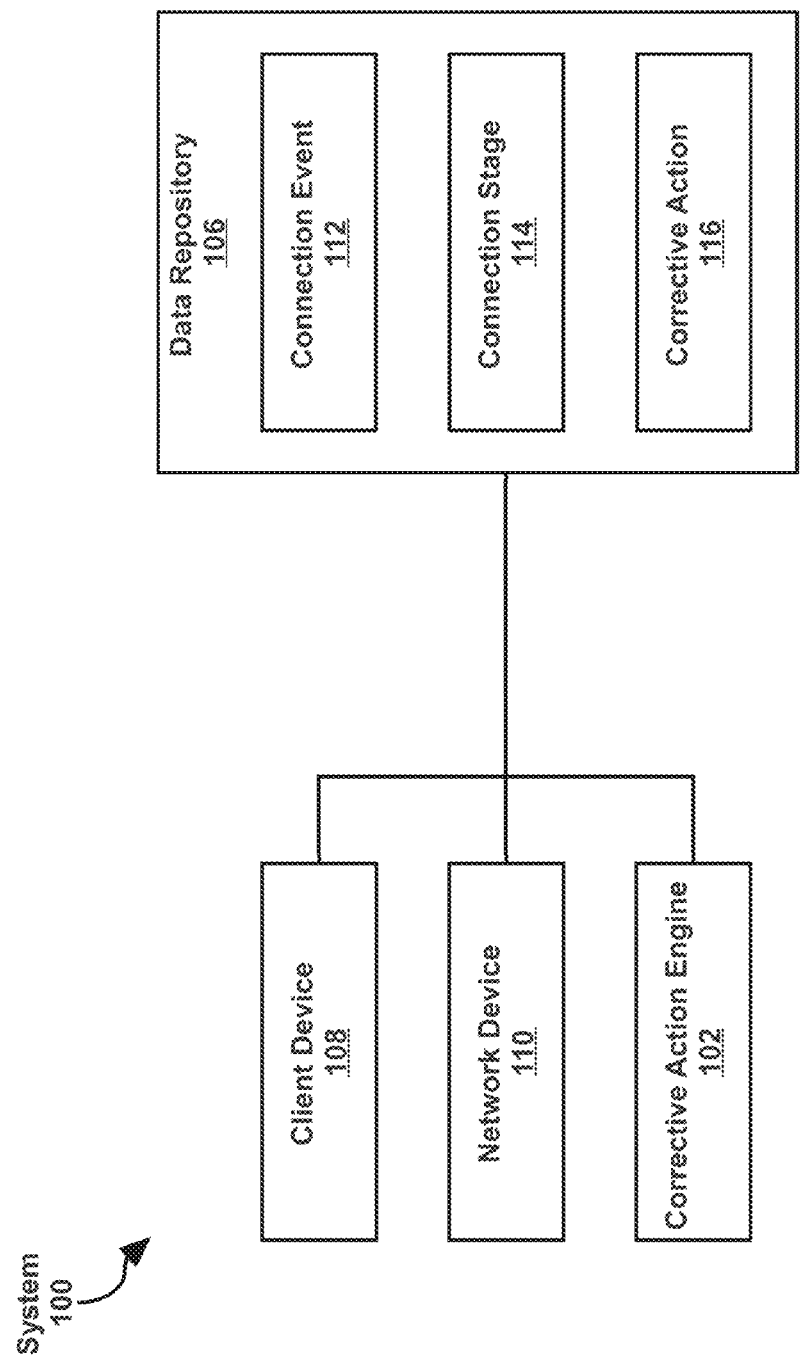
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview

One or more embodiments include executing a corrective action based on unsuccessful completion of a connection stage in a process for establishing a wireless connection between a client device and an access point (AP). The process for establishing a wireless connection may be during an initial connection attempt and/or during roaming. An event in a process for establishing a wireless connection between a client device and an AP is detected. The event may be detected based on a wireless signal transmitted by the client and/or an AP. A threshold amount of time passes subsequent to the detection of the event. If a particular connection stage is not completed after the threshold amount of time, then a connectivity problem is detected. Responsive to detecting the connectivity problem, a corrective action is executed.

One or more embodiments include executing a corrective action based on unsuccessful completion of a connection stage in a process for establishing a wireless connection between a client device and an access point (AP). The process for establishing a wireless connection may be during an initial connection attempt and/or during roaming. An event in a process for establishing a wireless connection between a client device and an AP is detected. The event may be detected based on a wireless signal transmitted by the client and/or an AP. A subsequent event is detected. The subsequent event may be, for example, a retry attempt by the client device, an attempt by the client device to associate with a different AP, and/or an error message transmitted by the client device and/or the AP. Based on the subsequent event, a connectivity problem is detected. Responsive to detecting the connectivity problem, a corrective action is executed.

In one or more embodiments, successful completion of the particular connection stage requires successful transmission of two or more messages subsequent to the event. As an example, a particular connection stage may involve two messages: (1) an Association or Re-association request, and (2) an Association) or Re-association response. Each of the two messages need to be successfully transmitted in order for the particular connection stage to be considered successfully completed.

In one or more embodiments, a corrective action may include executing or re-executing the transmission of one or more messages corresponding to a particular connection stage. As an example, a particular connection stage may include: (1) transmitting, from a client device to an AP, an Association or Re-association request, (2) transmitting, from the AP to the client device, an Association or Re-association response, and (3) transmitting, from the client device to the AP, an Authentication request. A client device may transmit an Association or Re-association request to a particular AP. The particular AP may transmit an Association or Re-association response to the client device. However, the particular AP may not receive a subsequent Authentication request. Based on a timeout and/or a subsequent event, the particular connection stage may be determined as unsuccessful. A corrective action may involve: (1) re-transmitting, from the client device to the particular AP, an Association or Re-association request, and/or (2) re-transmitting, from the particular AP to the client device, an Association or Re-association Response. Additionally or alternatively, if the Authentication request transmitted by the client device was detected by another AP, then the Authentication request may be forwarded to the particular AP. A corrective action may involve transmitting, from the particular AP to the client device, an Authentication response, as if the AP received the Authentication request.

One or more embodiments include selecting a corrective action based on a cause of a connectivity problem. A root-cause graph identifies various potential causes of a connectivity problem. A potential cause of a connectivity problem may be unsuccessful completion of a particular connection stage. Another potential cause may be an interference level (or another problem) that causes an unsuccessful completion of a particular connection stage. If a particular potential cause of a connectivity problem is detected in a wireless environment, then a corrective action corresponding to the particular potential cause is executed.

One or more embodiments described in this Specification and/or recited in the claims may not be included in this General Overview section.

2. Architectural Overview

FIG. 1 illustrates a system 100 in accordance with one or more embodiments. As illustrated in FIG. 1, system 100 includes one or more client devices 108, one or more network devices 110, a corrective action engine 102, and a data repository 106. In one or more embodiments, system 100 may include more or fewer components than the components illustrated in FIG. 1. The components illustrated in FIG. 1 may be local to or remote from each other. The components illustrated in FIG. 1 may be implemented in software and/or hardware and may be distributed over one or more applications and/or machines. Operations described with respect to one component may instead be performed by another component.

In an embodiment, system 100 may be implemented or executed as part of an Expert system, Rule-Based system, Self-Learning system, or Machine-Learning system, which implements Machine Intelligence or Artificial Intelligence techniques. System 100 may be executed and/or distributed on one or more network devices 110 that are local to a wireless environment provided by the network devices 110. Additionally or alternatively, system 100 may be executed and/or distributed on one or more digital devices that are remote from the wireless environment, such as a controller implemented in a cloud environment.

In one or more embodiments, a network device 110 is a digital device that facilitates communications between a client device 108 and a network resource. A network device 110 may receive information from a client device 108 and transmit the information to a network resource. Additionally or alternatively, a network device 110 may receive information from a network resource and transmit the information to a client device 108.

The term "digital device" generally refers to any hardware device that includes a processor. A digital device may refer to a physical controller device or a hardware device executing a virtual controller. Examples of digital devices include a computer, a tablet, a laptop, a desktop, a netbook, a server, a web server, authentication server, an authentication-authorization-accounting (AAA) server, a Domain Name System (DNS) server, a Dynamic Host Configuration Protocol (DHCP) server, a Remote Authentication Dial-In User Service (RADIUS) server, a Lightweight Directory Access Protocol (LDAP) server, an Internet Protocol (IP) server, a Virtual Private Network (VPN) server, a network policy server, a mainframe, a television, a content receiver, a set-top box, a video gaming console, a printer, a mobile handset, a smartphone, a personal digital assistant (PDA), a wireless receiver and/or transmitter, a base station, a communication management device, a router, a switch, a cloud server, a cloud controller, a controller, and an Access Point (AP) (including a wireless AP).

A digital device may be a wireless device. A wireless device is configured to exchange information with another digital device, without being connected by an electrical conductor to the other digital device. A wireless device includes one or more radios that transmit and/or receive radio waves. Data may be encoded on a radio wave based on a communications protocol, such as the IEEE 802.11 standard. An example of a wireless network device is a wireless AP.

A network device 110 may be associated with one or more wireless configurations 118. Examples of wireless configurations 118 of a network device 110 include but are not limited to a transmit power, a Modulation and Coding Scheme (MCS) or a Physical Layer (PHY) rate, a probe response threshold, a disassociate threshold, a receive sensitivity, a receive gain, a transmit cell size, a receive cell size, and a radio frequency (RF) channel.

In one or more embodiment, a client device 108 is configured to communicate wirelessly with a network device 110. A client device 108 may receive information from a network resource through a network device 110. Additionally or alternatively, a client device 108 may transmit information to a network resource through a network device 110.

As an example, a client device 108 may connect to a network resource through a network device 110. By connecting to the network resource, the client device 108 may receive web traffic, voice data streams, video data streams, and/or any other type of data.

As another example, a client device 108 may be located in a wireless environment without actively seeking to connect to a network resource. An Internet of Things (IoT) or Internet of Everything (IoE) environment may comprise a network of digital devices, each having particular functionality to sense, collect, monitor, detect, analyze, process, transmit, receive, and/or exchange data. An IoT or IoE device, operating in power-save mode, may not actively seek to connect to a network resource. The IoT or IoE device may periodically wake up to receive broadcast data from one or more network devices. The IoT or IoE device may use broadcast data to determine whether data addressed to the IoT or IoE device was transmitted within the prior period. The IoT or IoE device may connect to a network resource only upon a particular trigger.

A client device 108 may be associated with one or more wireless configurations 118. Examples of wireless configurations 118 of a client device 108 include but are not limited to a transmit power, a transmit cell size, a receive cell size, a MCS or PHY rate, a retry rate, an aggregation size, and an association with a particular AP.

In one or more embodiments, data repository 106 is any type of storage unit and/or device (e.g., a file system, database, collection of tables, or any other storage mechanism) for storing data. Further, data repository 106 may include multiple different storage units and/or devices. The multiple different storage units and/or devices may or may not be of the same type or located at the same physical site. Further, data repository 106 may be implemented or may execute on the same computing system as corrective action engine 102. Alternatively or additionally, data repository 106 may be implemented or executed on a separate computing system than corrective action engine 102. Data repository 106 may be connected to corrective action engine 102 via a direct connection or via a network.

Data sets describing connection event 112, connection stage 114, and corrective action 116 may be implemented across any of components within system 100. However, the data sets are illustrated within data repository 106 for purposes of clarity and explanation.

In one or more embodiments, connection event 112 is an event that occurs in a process for establishing a wireless connection between client device 108 and an AP. Connection event 112 may be an attempt, by client device 108, to associate with an AP. Additionally or alternatively, connection event 112 may be the transmission of a probe request by client device 108. Additionally or alternatively, connection event 112 may be the transmission of any wireless signal by client device 108.

In one or more embodiments, connection stage 114 comprises a sequence of two or more messages transmitted in a process for establishing a wireless connection between client device 108 and an AP. Successful completion of connection stage 114 may require successful transmission of two or more messages. Client device 108 may need to successfully pass one or more connection stages 114 in order to gain access to a network resource via one or more network devices 110. Examples of connection stages 114 include: (a) IEEE 802.11 association stage, (b) IEEE 802.1x authentication stage and keying stage, and (c) network address assignment stage.

A. IEEE 802.11 Association Connection Stage

Figure 2:
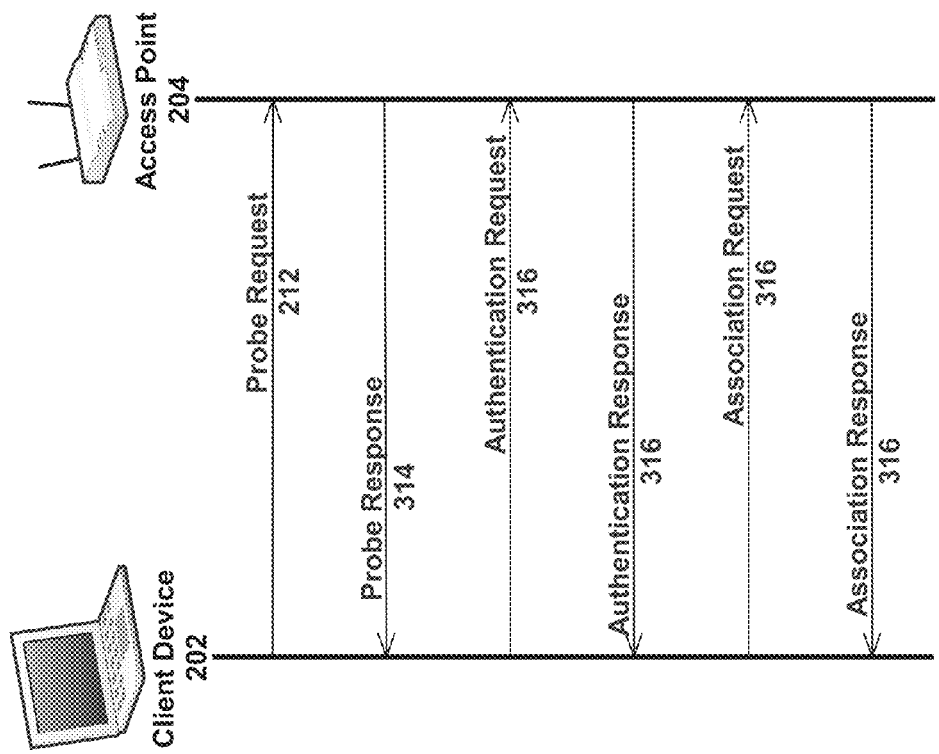
FIG. 2 illustrates an example sequence of messages transmitted during an 802.11 association connection stage, in accordance with one or more embodiments.

FIG. 2 illustrates an example sequence of messages transmitted during an 802.11 association connection stage 114. One or more messages illustrated in FIG. 2 may be modified, rearranged, or omitted all together. Accordingly, the particular sequence of messages illustrated in FIG. 2 should not be construed as limiting the scope of one or more embodiments.

A client device 202 transmits a probe request 212 to discover access points (APs) 204 within the client device's proximity. The probe request may advertise the client device's supported data rates and capabilities.

One or more APs receive the probe request 212. APs that are compatible with the client device's capabilities transmit a probe response 214 to the client device. An AP's probe response 214 may include the AP's supported data rates and capabilities. The capabilities may include Multi-User MIMO, uplink MIMO, Orthogonal Frequency-Division Multiple Access (OFDMA), beam forming, and/or aggregation.

The above exchange of a probe request and one or more probe responses may be repeated on multiple radio frequency (RF) channels. The client device transmits a probe request 212 on one RF channel. The client device remains on that RF channel for a specified time period to wait for probe responses 214 (if any). The client device may switch to another RF channel to repeat the above steps.

Alternatively, the client device may transmit a probe request 212 that specifies a service set identifier (SSID) of a service set for which connection is requested. Only an AP that supports the requested SSID will transmit a probe response 214.

Alternatively, the client device may not transmit any probe requests 212. The client device may passively receive beacon frames from one or more APs on one or more RF channels. An AP's beacon frame includes the AP's supported data rates and capabilities.

The client device selects one or more APs for receiving an authentication request 216 based on the APs' capabilities (as specified in the probe responses 214 (and/or beacon frames)). (In some cases, one or more APs may transmit an 802.11 v BSS transition request, which assists the client in selecting the APs.) The client device sends an authentication request 216 to each selected AP. The authentication request 216 does not necessarily include any authentication keys. For example, if the client device is attempting to connect to an open (unprotected) SSID, then the authentication request 216 might not include an authentication key. Alternatively, the client device may attempt to authenticate based on standards other than the 802.11 standard (such as, Wi-Fi Protected Access (WPA), or Wi-Fi Protected Access 2 (WPA2)). If other means of authentication may be performed, then the authentication request 216 might not include an authentication key. (Examples of operations for performing authentication based on the 802.1x standard are described below with reference to FIG. 3A.)

In response to the authentication request 216, the AP transmits an authentication response 218 to the client device. The authentication response 218 may simply acknowledge receipt of the authentication request 216.

The client device may receive authentication responses 218 from multiple APs. However, the client device may be associated with only one AP. The client device selects one of the APs for receiving an association request 220. The client device transmits an association request 220 to the selected AP.

The access point transmits an association response to the client device. The association response includes a status code indicating whether association is successfully completed.

B. IEEE 802.1x Authentication and Keying Connection Stages

In one or more embodiments, various authentication processes may be used to authenticate a wireless connection between a client device and an AP. One example is an 802.1x authentication connection stage 114. Additional examples include an 802.11r connection stage, pairwise master key (PMK) caching, and opportunistic key caching (OKC).

Figure 3A:
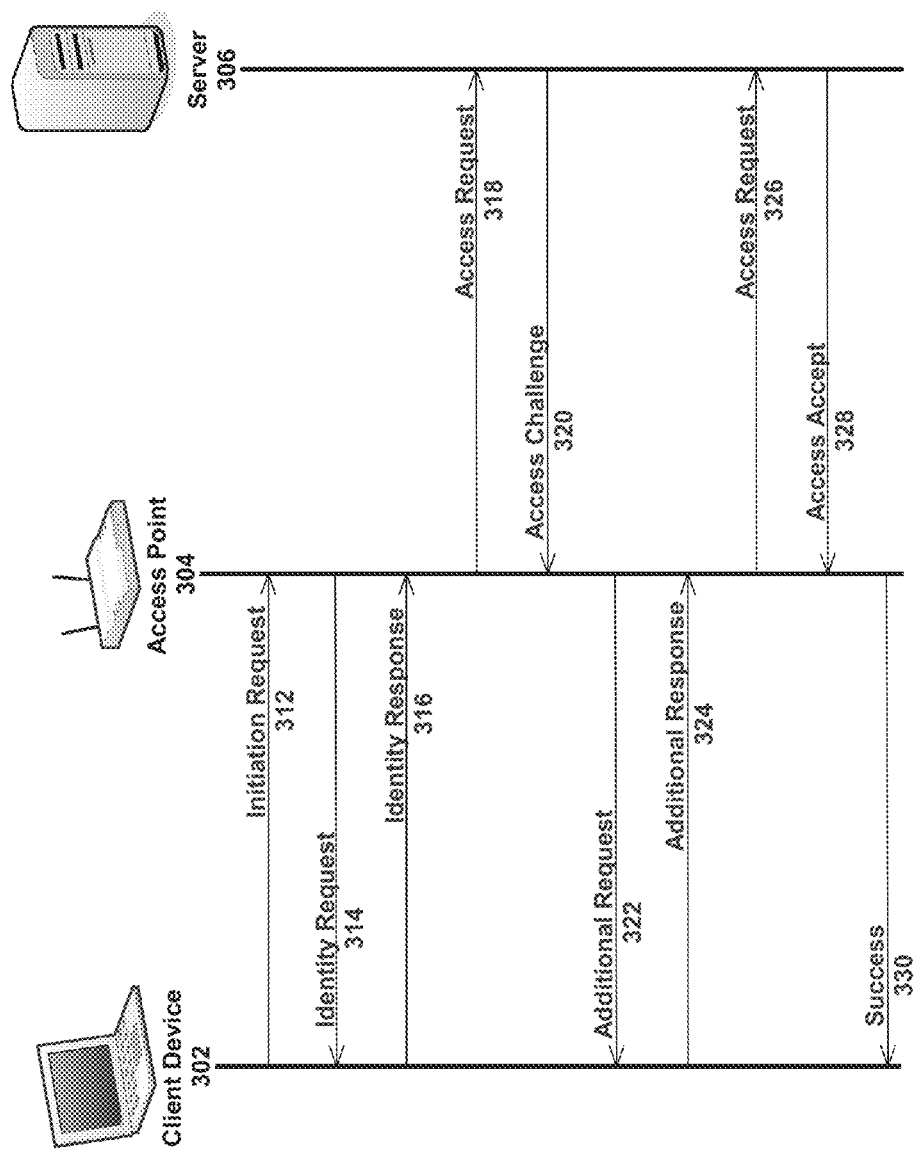
FIG. 3A illustrates an example sequence of messages transmitted during an 802.1x authentication connection stage, in accordance with one or more embodiments.

FIG. 3A illustrates an example sequence of messages transmitted during an 802.1x authentication connection stage 114. One or more messages illustrated in FIG. 3 may be modified, rearranged, or omitted all together. Accordingly, the particular sequence of messages illustrated in FIG. 3 should not be construed as limiting the scope of one or more embodiments.

An AP serves as an intermediary between a client device and an authentication server. During the 802.1x authentication process, the AP opens a controlled port to the client device that only allows communications conforming to the Extensible Authentication Protocol (EAP) over IEEE 802, which is also known as "EAP over LAN" ("EAPOL"). The AP communicates with the authentication server based on a network protocol, such as the Remote Authentication Dial-In User Service (RADIUS) protocol.

A client device 302 transmits an initiation request 312 (such as, an EAPOL-Start frame) to an AP 304 with which the client device is associated. The initiation request 312 initiates the 802.1x authentication process. Alternatively, the initiation request 312 is not sent. The 802.1x is automatically initiated after successful completion of the 802.11 association process.

The AP transmits an identity request 314 (such as, an EAPOL-Request Identity frame) to the client device. The identity request 314 includes a request for the credentials of the client device and/or a user of the client device. The client device transmits an identity response 316 (such as, an EAPOL-Response Identity frame) to the AP. The credentials may include a username and password, and/or a security certificate.

The AP forwards the credentials to an authentication server 306 in an access request 318 (such as, a RADIUS-Access Request frame). The authentication server attempts to verify the credentials. The authentication server may check the credentials against a local database or a remote database (such as a Lightweight Directory Access Protocol (LDAP) server, or an Active Directory server). Based on the comparison, the authentication server may respond to the access request 318 with one of the following responses: an access challenge 320, an access accept 328, or an access reject.

If more information is needed for the verification, the authentication server transmits an access challenge 320 (such as, a RADIUS-Access Challenge frame). The access challenge 320 is a prompt for additional information from the client device and/or user, such as a secondary password, PIN, or token. The access challenge 320 may optionally indicate the reason for requesting additional information. The AP forwards the prompt as an additional request 322 to the client device.

In response to the additional request 322, the client device transmits an additional response 324. The additional response 324 includes the additional credential information requested by the authentication server. The AP forwards the additional credential information as another access request 326.

If more information is still needed for verification, the authentication server may transmit another access challenge. The client device may response with additional credential information. These steps may be repeated until authentication is determined to be successful or unsuccessful.

If the authentication is unsuccessful, then the authentication server transmits an access reject (not illustrated) (such as, a RADIUS-Access Reject frame). The access reject indicates that authentication is unsuccessful. The AP forwards the failure message (such as, an EAPOL-Failure frame) to the client device.

If the authentication is successful, then the authentication server transmits an access accept 328 (such as, a RADIUS-Access Accept frame). The access accept 328 indicates that the authentication is successful. The AP forwards the success message 330 (such as, a EAPOL-Success frame) to the client device. The AP also sets the port to an "authorized" state. The client device may use the port to request a network address. (Examples of operations for requesting a network address are described below with reference to FIG. 4.) Additionally or alternatively, the client device may use the port to exchange data with a network resource.

In an embodiment, an 802.1x authentication connection stage 114 is based on a Pre-Shared Key (PSK) in addition to or in lieu of the authentication server 306 (such as, a RADIUS server). The PSK may be a passphrase which is known to both the client device and the AP. As an example, a PSK may be used in WPA-PSK and/or WPA2-PSK.

Figure 3B:
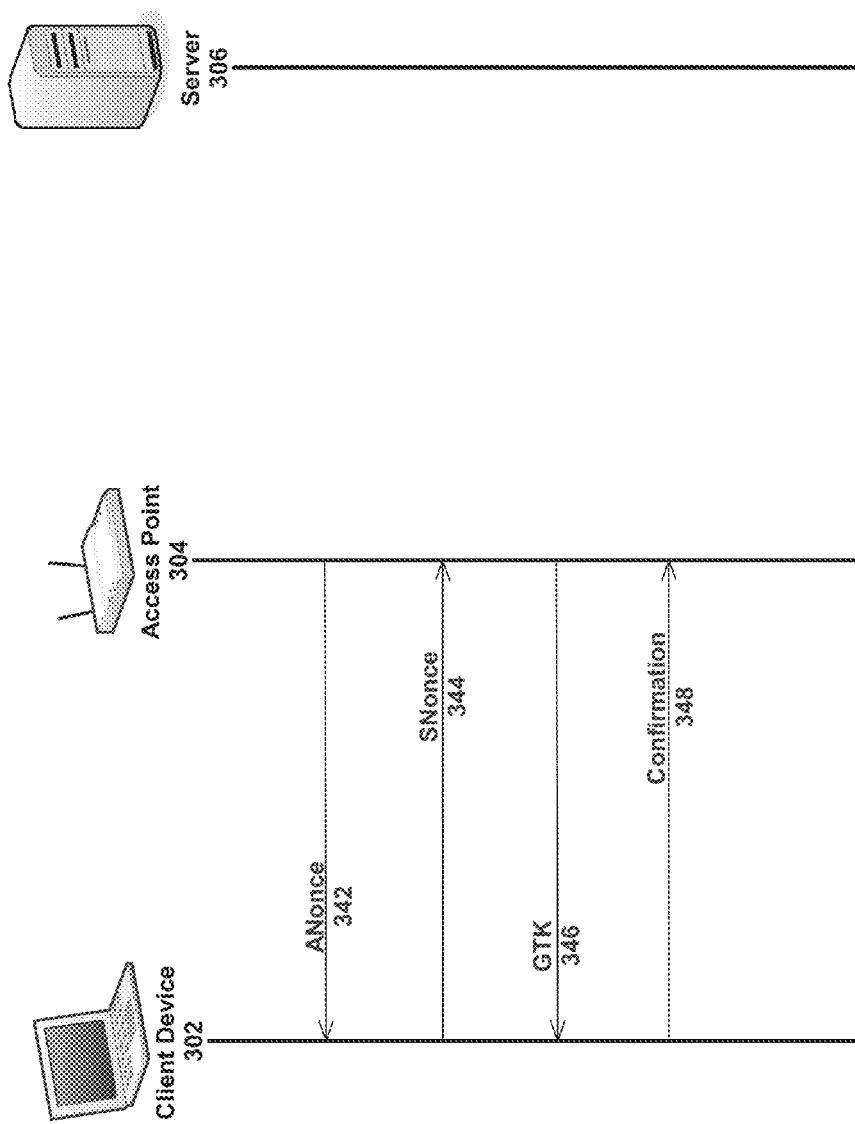
FIG. 3B illustrates an example sequence of messages transmitted during a 802.1x keying connection stage, in accordance with one or more embodiments.

FIG. 3B illustrates an example sequence of messages transmitted during a 802.1x keying connection stage 114. 802.1x keying is performed through a four-way handshake between the client device 302 and the AP 304.

The AP transmits a nonce, referred to as ANonce 342, to the client device. The AP also transmits an identifier of the AP (such as, a media access control (MAC) address of the AP).

The client device transmits another nonce, referred to SNonce 344, to the AP. The client device also transmits an identifier of the client device (such as, a MAC address of the client device).

The AP and the client device each now generate a Pairwise Transient Key (PTK) based on a pseudo-random function, with the following inputs: ANonce 342, the AP's MAC address, SNonce 344, the client device's MAC address, and a Pairwise Master Key (PMK) (which is shared between the AP and the client device). If a PSK is used, the PMK may be the PSK. The PTKs generated by the AP and the client device are identical.

The AP also generates a Group Temporal Key (GTK) based on a pseudo-random function, with the following inputs: ANonce 342, the AP's MAC address, SNonce 344, the client device's MAC address, and a Group Master Key (GMK) (which is known to the AP but not the client device).

The AP transmits the GTK 346 to the client device. This message is encrypted with the PTK.

The client device decrypts the message using the PTK to obtain the GTK 346. The client device transmits a confirmation 348, indicating that the client device has determined both the GTK and the PTK.

The PTK is used to encrypt unicast traffic between the client device and the AP. The PTK is unique to the client device. The GTK is used to encrypt multicast and broadcast traffic between the client device and the access point within a basic service set (BSS). All clients on the same BSS share an identical GTK.

802.1x rekeying may be performed at periodic time intervals. 802.1x rekeying repeats the keying process, using different nonces and/or pseudo-random functions.

C. Network Address Assignment Connection Stage

Figure 4:
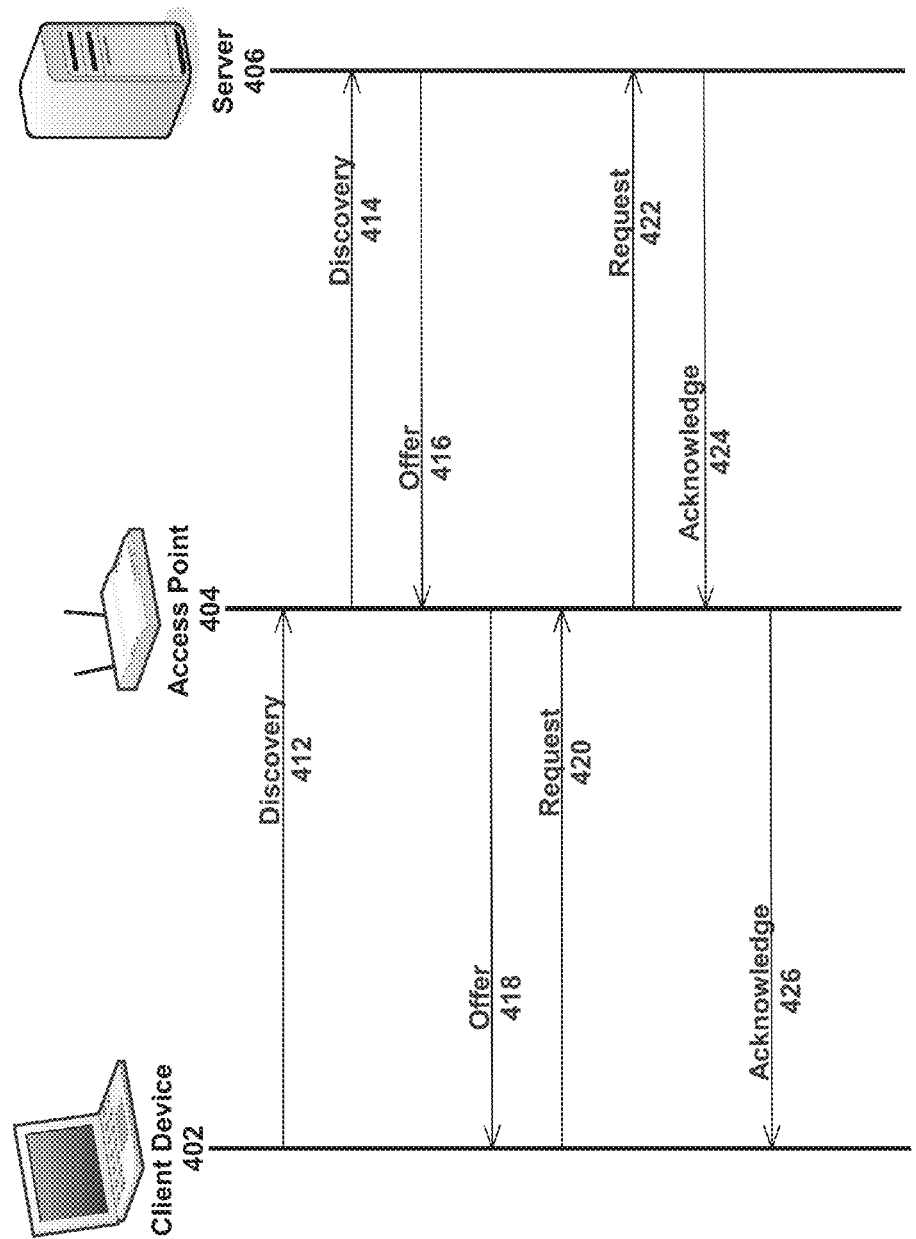
FIG. 4 illustrates an example sequence of messages transmitted during a network address assignment connection stage, in accordance with one or more embodiments.

FIG. 4 illustrates an example sequence of messages transmitted during a network address assignment connection stage 114. One or more messages illustrated in FIG. 4 may be modified, rearranged, or omitted all together. Accordingly, the particular sequence of messages illustrated in FIG. 4 should not be construed as limiting the scope of one or more embodiments.

An assignment server 406 (such as, a dynamic host configuration protocol (DHCP) server) is configured to assign a network address (such as, an Internet Protocol (IP) address) to a client device 402. The assignment server may be the same device as the AP 404. Alternatively, the assignment server may be a device separate from the AP. If the assignment server is separate from the AP, then the AP serves as an intermediary, forwarding messages between the client device and the assignment server.

The client device broadcasts a discover request 412 to search for assignment servers within the subnet of the client device. The AP forwards the discover request 414 to assignment servers within the subnet. The discover request 412 may be used to request a new network address or to renew the usage of the client device's last-known network address.

If the discover request 412 is a request to renew usage of the last-known network address, then the assignment server may transmit an acknowledge message 424 to grant the request. The acknowledge message 424 indicates that the same network address is granted to the client device. Alternatively, the assignment server may deny the request, or ignore the request. Upon receipt of the denial, or a timeout after receiving no response, the client device may transmit another discover request 412 for a new network address.

After receiving a discover request 412 for a new network address, the assignment server determines an appropriate network address (if any) to assign to the client device based on availability and usage policies. The assignment server then temporarily reserves the network address for the client device. The assignment server transmits an offer message 416 indicating the network address. The AP forwards the offer message 418 to the client device. Multiple assignment servers may transmit offer messages 416 to the client device. Each offer message 416 may indicate a different network address.

If the client device receives multiple offer messages 416 indicating different network addresses, then the client device selects one of the network addresses. The client device transmits a request message 420 for the assignment server offering the selected network address. The AP forwards the request message 422 to the assignment server. The request message 420 indicates that the client device intends to use the network address offered by the assignment server.

In response to the request message 422, the assignment server transmits an acknowledge message 424. The AP forwards the acknowledge message 426 to the client device. The acknowledge message 424 confirms that the assignment of the network address to the client device for a server-specified period of time.

After a network address has been assigned to the client device 108, network data may be exchanged between the client device 108 and a network resource. Client device 108 transmits and/or receives network data from a network resource via network device 110. Client device 108 may transmit a wireless signal including a data frame. In response to receiving the data frame, an AP may transmit a wireless signal including an acknowledgement frame. Alternatively, an AP may transmit a data frame using a wireless signal including a data frame. In responsive to receiving the data frame, a client device 108 may transmit a wireless signal including an acknowledgement frame. An exchange of a minimum amount of network data may be expected. The exchange of an amount of network data that is above the minimum threshold value may indicate that the network address assignment stage has been successfully completed.

Returning to FIG. 1, in one or more embodiments, corrective action 116 includes one or more actions that may be performed to correct, improve, or change a problem occurring in a process for establishing a wireless connection between client device 108 and an AP. Examples of corrective actions 126 include but are not limited to:

(a) executing and/or re-executing a set of operations associated with a particular connection stage 114 that is not successfully completed;

(b) executing and/or re-executing a set of operations associated with a connection stage 114 that was completed prior to the unsuccessful completion of another connection stage 114;

(c) forcing a client device 108 to switch from associating with a first access point to associating with a second access point;

(d) modifying one or more wireless configurations of a network device 110; and (e) modifying one or more wireless configurations of a client device 108.

One or more corrective actions 116 may be included in a root-cause graph. A root-cause graph identifies various potential causes of a connectivity problem. A potential cause may be an unsuccessful completion of a connection stage 114. Each potential cause, in the root-cause graph, is associated with one or more corrective actions 116. If a particular potential cause of a connectivity problem is detected in a wireless environment, then a corrective action 116 corresponding to the particular potential cause is executed.

In one or more embodiments, corrective action engine 102 refers to hardware and/or software configured to perform operations described herein for executing a corrective action 116 based on unsuccessful completion of a connection stage 114. Examples of operations for executing a corrective action 116 based on unsuccessful completion of a connection stage 114 are described below with reference to FIG. 5.

Corrective action engine 102 is implemented on one or more network devices 110, such as an AP. Additionally or alternatively, corrective action engine 102 is implemented on one or more other digital devices, such as a cloud controller.

Figure 5:
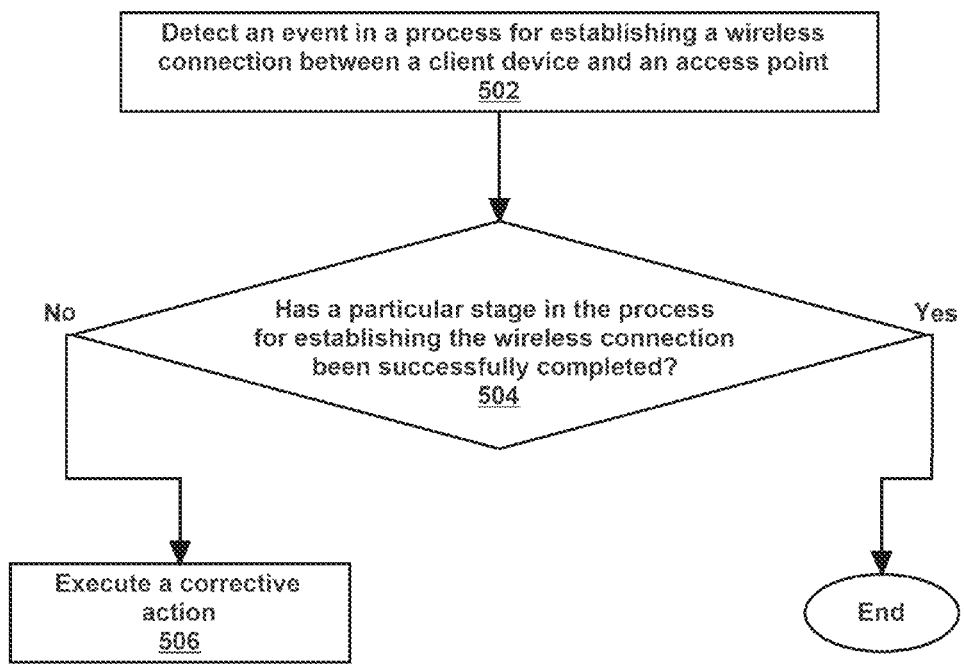
FIG. 5 illustrates an example set of operations for executing a corrective action based on unsuccessful completion of a connection stage, in accordance with one or more embodiments.

3. Executing a Corrective Action Based on Unsuccessful Completion of a Connection Stage FIG. 5 illustrates an example set of operations for executing a corrective action based on unsuccessful completion of a connection stage, in accordance with one or more embodiments. One or more operations illustrated in FIG. 5 may be modified, rearranged, or omitted all together. Accordingly, the particular sequence of operations illustrated in FIG. 5 should not be construed as limiting the scope of one or more embodiments.

One or more embodiments include detecting an event in a process for establishing a wireless connection between a client device and a particular access point (AP) (Operation 502). Detecting the event may comprise detecting a message transmitted in the process for establishing a wireless connection. The message may be transmitted through wired or wireless communications. As an example, the message may be an attempt by a client device to associate with an access point (such as, a probe request transmitted wirelessly by the client device). As another example, the message may be a RADIUS frame transmitted using wired communications by an authentication server. As another example, the message may be an offer message or an acknowledgement message transmitted by an assignment server.

Additionally or alternatively, detecting the event may comprise transmitting a message in the process for establishing a wireless connection. The message may be transmitted through wired or wireless communications. As an example, the message may be a probe response transmitted wirelessly by a particular AP. As another example, the message may be a RADIUS frame transmitted using wired communications from a particular AP to an authentication server. As another example, the message may be an 802.11v Basic Service Set (BSS) transition request, a de-authentication request, and/or a disassociation request, transmitted by a particular AP.

Additionally or alternatively, a client device may be detected. The client device may be detected based on a wireless signal that is transmitted by the client device. The wireless signal may not necessarily be encoded with any messages.

Alternatively, the wireless signal may be encoded with a message that is not decodable by the particular AP. As an example, a client device may transmit a wireless signal in a particular RF band. An AP may operate in a different RF band. The AP may receive the wireless signal from the client device. However, since the client device and the AP are operating in different RF bands, the AP may not be able to decode and/or interpret the wireless signal. As another example, a client device may transmit a wireless signal that does not conform to the IEEE 802.11 standard. The wireless signal may conform to, for example, a Bluetooth specification. An AP may not be able to decode and/or interpret the wireless signal.

Alternatively, the wireless signal may be encoded with a message that is not transmitted in a process for establishing a wireless connection. As an example, a client device may transmit a Bluetooth signal. The Bluetooth signal is not transmitted for the purpose of establishing a wireless connection with an AP.

One or more embodiments include determining whether a particular stage in the process for establishing the wireless connection has been successfully completed (Operation 504). Whether the particular stage has been successfully completed may be determined based on (a) a timeout and/or (b) detection of a particular error or event.

In an embodiment, whether the particular stage has been successfully completed within a particular time period since the event detected at Operation 502 is determined. After detection of the event in the process for establishing a wireless connection, a timer is started. The timer determines whether a threshold amount of time has passed.

The threshold amount of time may be set by user input and/or determined based on historical data. Different threshold time periods may apply for different connection stages. As an example, historical data may indicate that an average time period required for completion of a particular connection stage may be five seconds. Based on the historical data, the threshold time period for the particular connection stage may be determined to be five seconds.

When the timer records that the threshold amount of time has passed, whether a particular stage in the process for establishing the wireless connection has been successfully completed is determined. If transmission of any of the messages required for successful completion of the particular stage are unsuccessful, then completion of the particular stage is determined to be unsuccessful. Unsuccessful transmission of a message, from a transmitting device to a receiving device, may be indicated by one or more of the following: (a) failure, by the transmitting device, to transmit the message, (b) failure, by the receiving device, to receive the message, (c) failure, by the transmitting device, to receive acknowledge of receipt of the message, and (d) receipt, by the transmitting device, of an error message from the receiving device. If the particular stage is not successfully completed, then a connectivity problem is found.

Successful completion of the particular stage, in the process for establishing the wireless connection, requires the successful transmission of two or more messages subsequent to occurrence and/or detection of the event (and/or client device). As an example, a particular stage may require (1) a client device to transmit Message X, (2) an AP to transmit Message Y, and (3) the client device to transmit Message Z. A particular AP may receive Message X from a client device. Receipt of Message X may be determined as an event in a process for establishing a wireless connection. Successful completion of the particular stage may require successful transmission of two messages subsequent to the receipt of Message X: Message Y and Message Z.

As another example, a particular stage may require (1) an AP to transmit Message X, (2) a client device to transmit Message Y, and (3) the AP to transmit Message Z. A particular AP may transmit Message X to a client device. Transmission of Message X may be determined as an event in a process for establishing a wireless connection. Successful completion of the particular stage may require successful transmission of two messages subsequent to the transmission of Message X Message Y and Message Z.

Additional examples of connection stages are described above in Section 2, including (a) IEEE 802.11 association stage, (b) IEEE 802.1x authentication stage and keying stage, and (c) network address assignment stage. Connection stages may occur during initial connection, a re-connection and/or re-association, roaming to a different AP and/or a different network.

As an example, a particular stage may be an IEEE 802.1x authentication stage. An AP may transmit an identity request. Successful completion of the particular stage may require successful transmission of the following messages: identity response (from the client device to the AP), access request (from the AP to an authentication server), access accept (from the authentication server to the AP), and success (from the AP to the client device). One or more access challenge messages may optionally be transmitted from the authentication server to the AP. Successful transmission of an access challenge message may not be required for successful completion of the particular stage.

As another example, a particular stage may be a network address assignment stage. A client may transmit a discovery message associated with the network address assignment stage. Successful completion of the particular stage may require successful transmission of the following messages: an offer message, a request message, and an acknowledgement message. Further, successful completion of the particular stage may be indicated by an exchange of an amount of network data that exceeds a minimum threshold value. If the amount of network data exchanged is below the minimum threshold value, then the particular stage may be determined as unsuccessful.

In an embodiment, whether an error or other event indicating that the particular stage has not been successfully completed has occurred is determined. Another AP and/or network device may monitor and/or observe the wireless environment for errors and/or events.

An error may be an error message transmitted by the client device and/or the particular AP. The error message may indicate that a reset of the client device, so that the client device may reinitiate and/or re-attempt the process of authenticating, associating, and/or obtaining IP address. As an example, a particular connection stage may require (a) a client device to transmit Message A to an AP, (b) the AP to transmit Message B to the client device, and (c) the client device to transmit Message C to the AP. A particular client device may transmit Message A to a particular AP. The particular AP may respond with Message B. The client device may respond with an error message rather than Message C. Meanwhile, the particular AP might not be able to receive the error message due to interference. However, another AP may receive the error message. Based on the other AP's receipt of the error message, unsuccessful completion of the particular connection stage may be determined. The particular AP's failure to receive any messages (whether Message C or the error message) does not necessarily cause any timeouts. The unsuccessful completion of the particular connection stage may be determined before any timeouts, corresponding to the particular AP, occur.

An event indicating that the particular stage has not been successfully completed may be a retry message transmitted by the client device and/or the particular AP. As an example, a particular connection stage may require (a) a client device to transmit Message A to an AP, (b) the AP to transmit Message B to the client device, and (c) the client device to transmit Message C to the AP. A particular client device may transmit Message A to a particular AP. However, the client device may not receive Message B back from the particular AP. Then the client device may retry transmission of Message A. The particular AP may not be able to detect Message A due to interference. However, another AP may receive the first transmission and the retry transmission of Message A. Based on the detection of the retry transmission, unsuccessful completion of the particular connection stage may be determined. The particular AP's failure to receive any messages (in this case, Message A) does not necessarily cause any timeouts. The unsuccessful completion of the particular connection stage may be determined before any timeouts, corresponding to the particular AP, occur. As another example, an event indicating that the particular stage has not been successfully completed may be detection of a certain number of times of retries. If a client device does not receive a response after transmitting a particular message, the client device may retry transmitting the particular message n times. Based on the detection of an nth retry transmission, unsuccessful completion of the particular connection stage may be determined.

As another example, an event indicating that the particular stage has not been successfully completed may be detection of a de-authentication, dis-association, and/or another disconnect message transmitted from a client device. The disconnect message may precede the client device's reinitiation and/or re-attempt of an association and/or authentication process.

One or more embodiments include executing a corrective action (Operation 506). The corrective action is selected based on the particular stage that was not successfully completed. The corrective action may involve executing and/or re-executing the particular stage and/or a connection stage that was successfully completed prior to the particular stage. The corrective action may involve transmitting a message of the particular stage and/or the prior connection stage.

Executing the corrective action may include transmitting two or more messages of the particular stage. As an example, an IEEE 802.11 association stage may be uncompleted. A probe request, a probe response, and an authentication request may have been successfully transmitted. However, an authentication response, an association request, and an association response were not successfully transmitted. Execution of a corrective action may include re-transmitting the probe request, the probe response, and the authentication request.

Executing the corrective action may include transmitting two or more messages of a connection stage that was successfully completed prior to the particular stage. Following transmission of the messages of the prior connection stage, messages of the particular stage may be transmitted. As an example, an IEEE 802.11 association stage may be completed. However, an IEEE 802.1x authentication stage may be uncompleted. Execution of a corrective action may include re-transmitting the messages corresponding to the association stage and the authentication stage. Execution of the corrective action may include re-transmitting the probe request and all the following messages in the association stage and the authentication stage.

In an embodiment, the corrective action is selected using a root-cause graph. One or more network conditions are detected during the time period between the detection of the event at Operation 502 and the determination of the unsuccessful completion of the particular stage at Operation 504. The network conditions may include identification of the particular stage that was not successfully completed. Additionally or alternatively, the network conditions may include identification of stage(s) that were successfully completed, identification of messages that were successfully transmitted, wireless configuration(s) of the client device and/or the AP, a received signal strength indicator (RSSI) and/or signal-to-noise ratio (SNR) of wireless signal transmitted by the client device and/or the AP, an interference level detected by the client device and/or the AP, and a device type and/or identifier of the client device.

The root-cause graph indicates which network conditions correspond to which potential causes of a connectivity problem. The root-cause graph indicates one or more corrective actions corresponding to each potential cause. As an example, a network condition may be a failure to receive an 802.1x key for encoding network data. A root-cause graph may map this network condition to a particular potential cause: unsuccessful completion of the 802.1x keying stage. The root-cause graph may further indicate that a corrective action corresponding to the particular potential cause is a re-transmission, by the AP to the client device, of a nonce used for determining the 802.1x key.

Each potential cause included in the root-cause graph is associated with a different level of specificity. As an example, a first potential cause of a connectivity problem may be an error in the transmission of one or more messages implementing the IEEE 802.1x network protocol. A second potential cause may be an error in the keying process under the IEEE 802.1x network protocol. The second potential cause is associated with a higher level of specificity than the first potential cause. If multiple potential causes are detected, then a corrective action corresponding to a potential cause associated with a highest level of specificity is executed. A correction action corresponding to a potential cause associated with a higher level of specificity may require execution or re-execution of a fewer number of steps than a corrective action corresponding to a potential cause associated with a lower level of specificity.

In an embodiment, a cause of a connectivity problem between a client device and a particular AP may be detected by another AP. The client device may transmit a message in the process of establishing a connection with the particular AP. However, the particular AP may not receive the message due to interference or another issue. An unsuccessful completion of a particular connection stage may be determined. A first cause of the connectivity problem may be the unsuccessful completion of the particular connection stage.

Meanwhile, another AP may receive the message transmitted by the client device. Since the other AP received the message, the cause of the connectivity problem is not that the client device failed to send the message. The cause of the connectivity problem is related to the particular AP's failure to receive the message. Hence, a second cause of the connectivity problem may be the particular AP's failure to receive the message.

A corrective action associated with the first cause of the connectivity problem (unsuccessful completion of the particular connection stage) may be to re-execute the particular connection stage. A corrective action associated with the second cause of the connectivity problem (failure to receive the message by the particular AP) may be to continue the process of establishing a connection between the client device and the particular AP, as if the particular AP received the message. Based on the message received by the other AP, a response may be generated. The particular AP may transmit the response to the client device.

A root-cause graph may indicate that the second cause is a more specific cause of the connectivity problem, than the first cause. The root-cause graph may indicate that the corrective action associated with the second cause includes a fewer number of operations than the corrective action associated with the first cause. Since the second cause is more specific than the first cause, the corrective action associated with the second cause may be selected and executed.

As an example, a root-cause graph may include the following potential causes of a connectivity problem: (a) unsuccessful completion of the 802.1x keying stage, and (b) a SNR of wireless signals received by an AP being below a threshold value. The root-cause graph may indicate that low SNR is at a higher level of specificity than unsuccessful completion of the 802.1x keying stage.

The root-cause graph may further indicate that a corrective action corresponding to unsuccessful completion of the 802.1x keying stage includes re-starting the 802.1x keying stage with transmission of the first message in the stage (which is, transmission of a nonce from an AP to a client device). Hence, at least four messages need to be transmitted (ANonce, SNonce, GTK, and Confirmation messages).

The root-cause graph may further indicate that a corrective action corresponding to low SNR includes (1) increasing a transmit power of a client device and (2) re-transmitting, by the client device, a particular wireless signal that was received with an SNR below the threshold value.

Continuing the example, an AP may determine that the AP has not received, from a client device, a nonce that is necessary for generating an 802.1x key within a threshold amount of time. The AP may also determine that the AP has not transmitted a GTK within the threshold amount of time. Hence, unsuccessful completion of the 802.1x keying stage is detected. Additionally, the AP may receive a particular wireless signal from the client device. The AP may determine that the SNR of the particular wireless signal is below the threshold value.

Continuing the example, whether unsuccessful completion of the 802.1x keying stage or low SNR is a potential cause associated with a higher level of specificity may be determined. Based on the root-cause graph, low SNR is associated with a higher level of specificity. A corrective action corresponding to low SNR may be selected. Hence, the transmit power of the client device may be increased. The particular wireless signal that was initially received with a low SNR may be re-transmitted by the client device.

4. Example Embodiment

Figure 6:
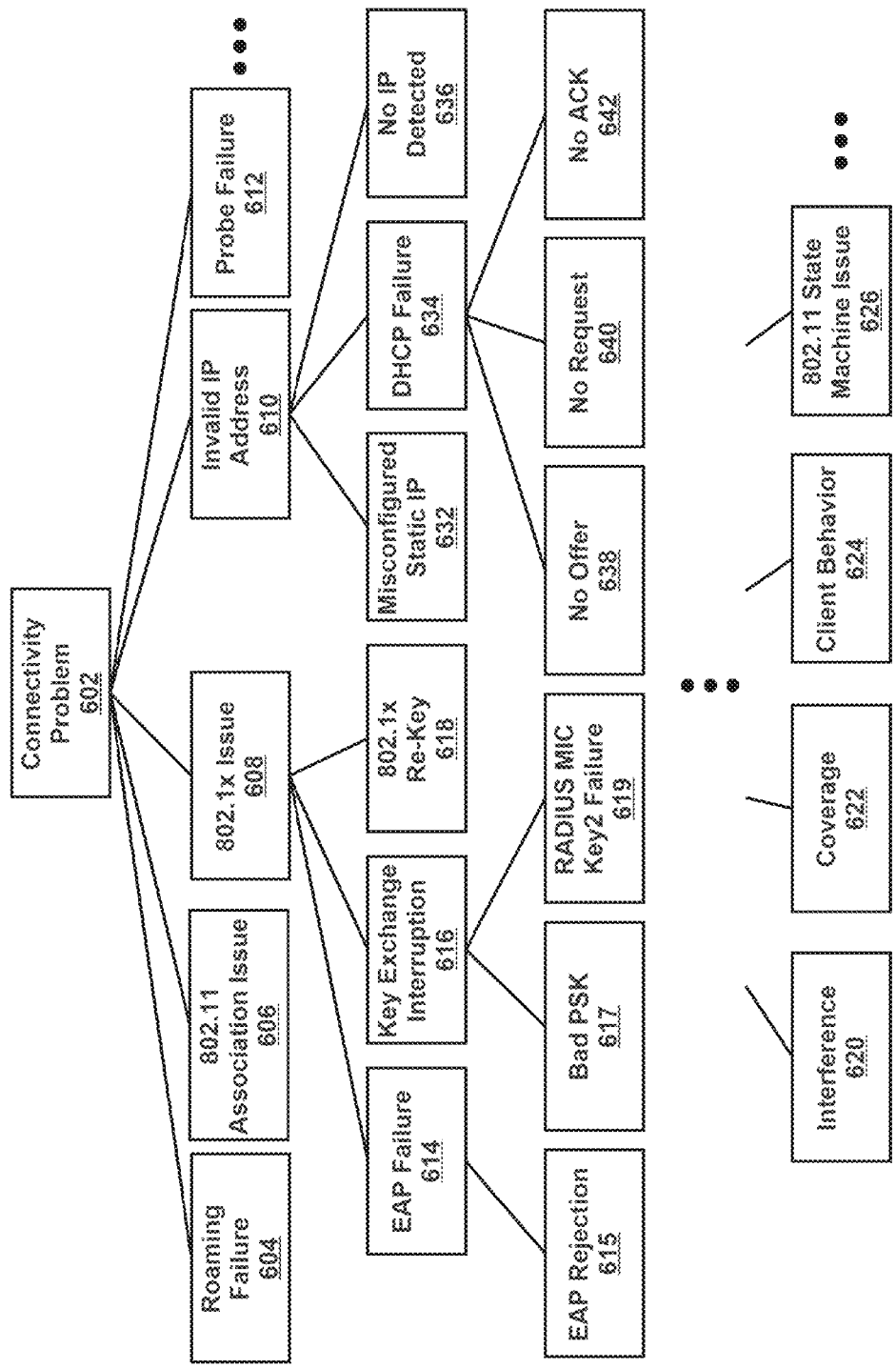
FIG. 6 illustrates an example of executing a corrective action based on unsuccessful completion of a connection stage using a root-cause graph, in accordance with one or more embodiments.

A detailed example is described below for purposes of clarity. Components and/or operations described below should be understood as one specific example which may not be applicable to certain embodiments. Accordingly, components and/or operations described below should not be construed as limiting the scope of any of the claims. FIG. 6 illustrates an example of executing a corrective action based on unsuccessful completion of a connection stage using a root-cause graph, in accordance with one or more embodiments.

As illustrated, the root-cause graph includes multiple levels, each level representing a particular level of specificity associated with a potential cause of a connectivity problem. As referred to herein, each level is consecutively numbered, with the top level being "Level 1." A node that is connected to another node in a higher level represents a potential cause of the problem represented by the node in the higher level.

The top node 602, in Level 1, represents a connectivity problem. Each node in Level 2 that is connected to the top node 602 represents a potential cause of the connectivity problem. For example, a problem with the execution of 802.1x protocols, represented by node 608, may be a cause of the connectivity problem. Each node in Level 3 that is connected to node 608 represents a potential cause of the 802.1x problem. For example, a problem relating to EAP failure, represented by node 614, may be a potential cause. A problem relating to key exchange interruption, represented by node 616, may be a potential cause. A problem relating to 802.1x re-key, represented by node 618, may be a potential cause. Nodes on the lowest level of the root-cause graph represent potential root causes of the connectivity issue.

Examples of nodes within a root-cause graph are illustrated in FIG. 6. Top node 602, in Level 1, represents a connectivity problem. Node 604 representing "Roaming Failure," node 606 representing "802.11 Association Issue," node 608 representing "802.1x Issue," node 610 representing "Invalid IP Address," and node 612 representing "Probe Failure" are on Level 2. Nodes 604-612 represent potential causes of the connectivity problem. Node 614 representing "EAP Failure," node 616 representing "Key Exchange Interruption," and node 618 representing "802.1x Re-Key" are on Level 3. Nodes 614, 616, 618 represent potential causes of an 802.1x issue. Node 632 representing "Misconfigured Static IP," node 634 representing "DHCP Failure," and node 636 representing "No IP Detected" are on Level 3. Nodes 632-636 represent potential causes of an invalid IP address. Node 615 representing "EAP Rejection" is on Level 4. Node 615 represents a potential cause of an EAP failure. Node 617 representing "Bad PSK" and node 619 representing "RADIUS MIC Key2 Failure" are on Level 4. Nodes 617 and 619 represent potential causes of a key exchange interruption. Node 638 representing "No Offer," node 640 representing "No Request," and node 642 representing "No ACK" are on Level 4. Nodes 638-642 represent potential causes of a DHCP failure. Node 620 representing "Interference," node 622 representing "Coverage," node 624 representing "client behavior," and node 626 representing "802.11 State Machine Issue" are on one or more lower levels of the root-cause graph. Nodes 620-626 may be on the bottom level of the root-cause graph, representing a potential root cause of the connectivity problem.

Problems, represented by the nodes of the root-cause graph, are detected by one or more monitors implemented in a wireless environment. As an example, an 802.1x issue (represented by node 608) may be detected by a first monitor. The first monitor detects whether the AP is successfully receiving network traffic sent from the client device. If not, then an 802.1x issue is detected.

As another example, an 802.1x authentication issue (represented by node 614) may be detected by a second monitor. The second monitor detects whether the AP has sent a success message indicating that 802.1x authentication has successfully completed (such as, success message 330 of FIG. 3A). If not, then an 802.1x authentication issue is detected.

As another example, a key exchange interruption (represented by node 616) may be detected by a third monitor. The third monitor detects whether the AP has received a confirmation message indicating that the client device has determined the PTK and GTK (such as, confirmation message 348 of FIG. 3B). If not, then a key exchange interruption is detected.

Each node may be associated with one or more corrective actions. If a connectivity problem is detected, and a particular potential cause (represented by a particular node) is detected, then the corrective action associated with the particular potential cause may be performed. A node on a lower level is associated with a more specific corrective action than a node on a higher level. If multiple issues represented by nodes on different levels are detected, then the corrective action associated with the node on the lower level is performed.

A corrective action associated with node 608, representing an 802.1x problem, may involve re-executing the transmission of all messages in the 802.1x process. The 802.1x process may restart with the transmission of the identity request 314 of FIG. 3A. The transmission of messages 316-348 would follow.

Meanwhile, a correction action associated with node 614, representing a key exchange interruption, may involve re-executing the transmission of messages for the 802.1x keying process only. The 802.1x process may restart with the transmission of the ANonce 342 of FIG. 3B. The transmission of messages 344-348 would follow.

In an example, an event in a process for establishing a wireless connection between a client device and an AP is detected. The AP detects a receipt of an initiation request associated with an IEEE 802.1x authentication stage. After a threshold amount of time passes, the AP determines that the AP has not received a success message (such as, a EAPOL-Success frame) from the client device. The AP determines that there is an EAP failure, and that the 802.1x authentication stage is not successfully completed. The AP determines that there is a connectivity problem between the AP and the client device.

Continuing the example, a corrective action is selected using the root-cause graph illustrated in FIG. 6. The AP determines that the AP is not receiving network traffic from the client device. Based on the lack of network traffic, a potential cause of the connectivity problem is determined as an 802.1x problem (represented by node 608). Additionally, as stated above, an EAP failure is determined (represented by node 614). Since node 614 is associated with a higher level of specificity than node 608, a corrective action associated with node 614 is selected and executed. The corrective action includes re-starting the 802.1x authentication stage, starting with transmitting an identity request from the AP to the client device.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
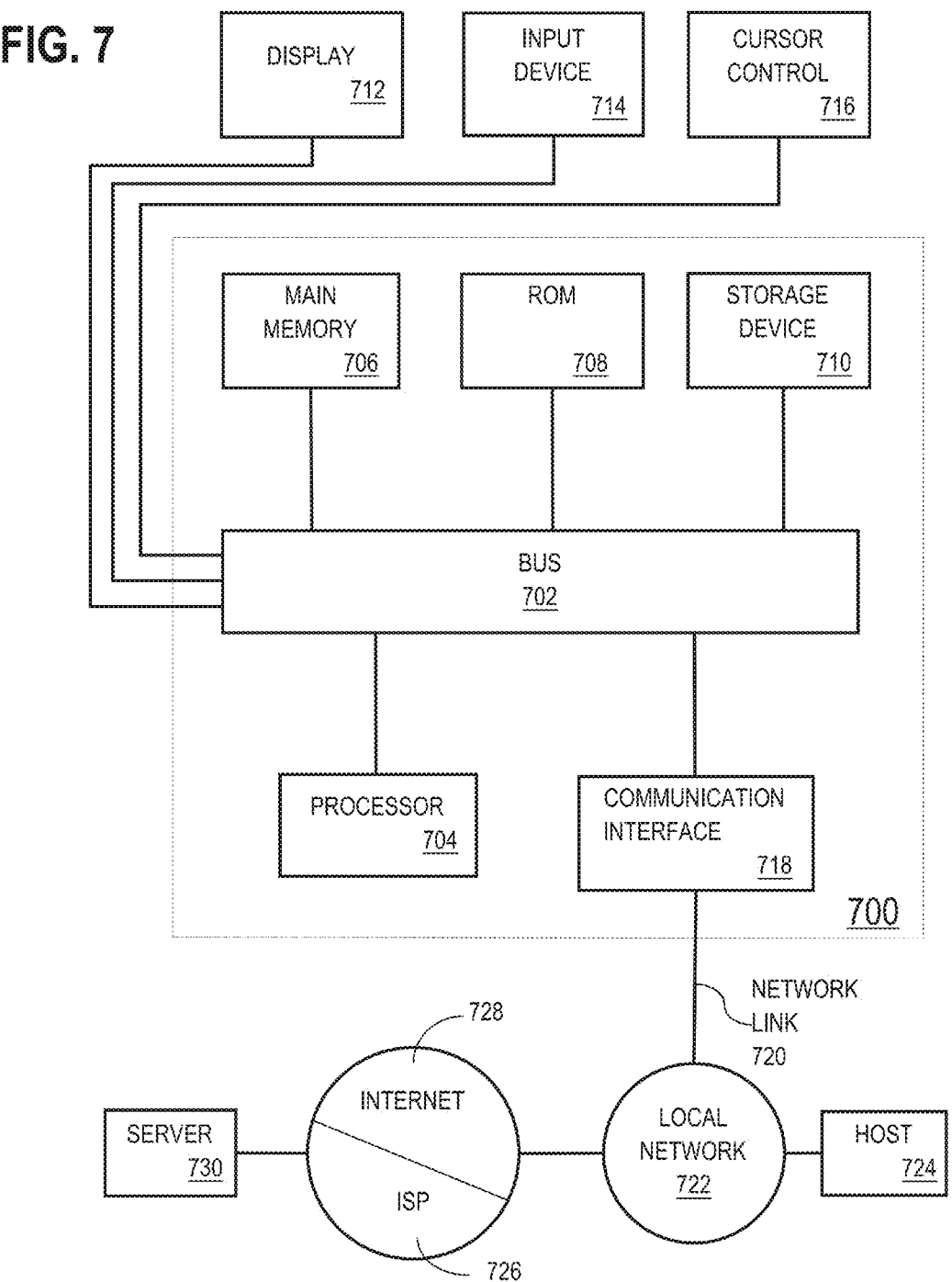
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:

detecting a first event in a process for establishing a wireless connection between a client device and an access point;

detecting a second event indicating that a particular stage in the process for establishing the wireless connection between the client device and the access point has not been successfully completed;
identifying a cause associated with the particular stage not being successfully completed, comprising:
identifying a first potential cause and a second potential cause associated with the particular stage not being successfully completed;
determining that the first potential cause is more specific than the second potential cause based on a root-cause graph; and
identifying the first potential cause as the cause associated with the particular stage not being successfully completed;
identifying a set of operations corresponding to the cause; and
executing the set of operations.

2. The medium of claim 1, wherein detecting the second event indicating that the particular stage in the process for establishing the wireless connection between the client device and the access point has not been successfully completed comprises: detecting a retry transmission of a particular message from the client device.

3. The medium of claim 1, wherein the first potential cause is associated with a first corrective action comprising a first set of operations, the second potential cause is associated with a second corrective action comprising a second set of operations, and a first number of the first set of operations is less than a second number of the second set of operations.

4. The medium of claim 1, wherein determining that the first potential cause is more specific than the second potential cause based on the root-cause graph comprises:
determining that the first potential cause is associated with a first level of the root-cause graph;
determining that the second potential cause is associated with a second level of the root-cause graph;
determining that the first level of the root-cause graph is lower than the second level of the root-cause graph.

5. The medium of claim 1, wherein the second event is detected prior to a timeout occurring on the access point.

6. The medium of claim 1, wherein detecting the second event indicating that the particular stage in the process for establishing the wireless connection between the client device and the access point has not been successfully completed comprises: detecting a transmission of an error message from the client device.

7. The medium of claim 6, wherein the access point does not detect the transmission of the error message from the client device, and a second access point detects the transmission of the error message from the client device.

8. The medium of claim 1, wherein detecting the second event indicating that the particular stage in the process for establishing the wireless connection between the client device and the access point has not been successfully completed comprises: detecting a transmission, from the client device, of a particular message comprising at least one of: a de-authentication message, a dis-association message, and a disconnect message.

9. The medium of claim 8, wherein the access point does not detect the transmission of the particular message from the client device, and a second access point detects the transmission of the particular message from the client device.

10. The medium of claim 2, wherein the access point does not detect the retry transmission of the particular message from the client device, and a second access point detects the retry transmission of the particular message from the client device.

11. A method, comprising:
detecting a first event in a process for establishing a wireless connection between a client device and an access point;
detecting a second event indicating that a particular stage in the process for establishing the wireless connection between the client device and the access point has not been successfully completed;
identifying a cause associated with the particular stage not being successfully completed, comprising:
identifying a first potential cause and a second potential cause associated with the particular stage not being successfully completed;
determining that the first potential cause is more specific than the second potential cause based on a root-cause graph; and
identifying the first potential cause as the cause associated with the particular stage not being successfully completed;
identifying a set of operations corresponding to the cause; and
executing the set of operations;
wherein the method is performed by at least one device including a hardware processor.

12. The method of claim 11, wherein the first potential cause is associated with a first corrective action comprising a first set of operations, the second potential cause is associated with a second corrective action comprising a second set of operations, and a first number of the first set of operations is less than a second number of the second set of operations.

13. The method of claim 11, wherein determining that the first potential cause is more specific than the second potential cause based on the root-cause graph comprises:
determining that the first potential cause is associated with a first level of the root-cause graph;
determining that the second potential cause is associated with a second level of the root-cause graph;
determining that the first level of the root-cause graph is lower than the second level of the root-cause graph.

14. The method of claim 11, wherein the second event is detected prior to a timeout occurring on the access point.

15. The method of claim 11, wherein detecting the second event indicating that the particular stage in the process for establishing the wireless connection between the client device and the access point has not been successfully completed comprises: detecting a retry transmission of a particular message from the client device.

16. The method of claim 15, wherein the access point does not detect the retry transmission of the particular message from the client device, and a second access point detects the retry transmission of the particular message from the client device.

17. A system comprising:
at least one device including a hardware processor; and
the system being configured to perform operations comprising:
detecting a first event in a process for establishing a wireless connection between a client device and an access point;
detecting a second event indicating that a particular stage in the process for establishing the wireless connection between the client device and the access point has not been successfully completed;

identifying a cause associated with the particular stage not being successfully completed, comprising:
   identifying a first potential cause and a second potential cause associated with the particular stage not being successfully completed;
   determining that the first potential cause is more specific than the second potential cause based on a root-cause graph; and
   identifying the first potential cause as the cause associated with the particular stage not being successfully completed;
identifying a set of operations corresponding to the cause; and
executing the set of operations.

18. The system of claim 17, wherein the first potential cause is associated with a first corrective action comprising a first set of operations, the second potential cause is associated with a second corrective action comprising a second set of operations, and a first number of the first set of operations is less than a second number of the second set of operations.

19. The system of claim 17, wherein determining that the first potential cause is more specific than the second potential cause based on the root-cause graph comprises:
   determining that the first potential cause is associated with a first level of the root-cause graph;
   determining that the second potential cause is associated with a second level of the root-cause graph;
   determining that the first level of the root-cause graph is lower than the second level of the root-cause graph.

20. The system of claim 17, wherein detecting the second event indicating that the particular stage in the process for establishing the wireless connection between the client device and the access point has not been successfully completed comprises: detecting a retry transmission of a particular message from the client device.

* * * * *